United States Patent

Sigmundstad

[11] Patent Number: 5,895,077
[45] Date of Patent: *Apr. 20, 1999

[54] SWIVEL APPARATUS FOR FLUID TRANSPORT

[75] Inventor: Martin Sigmundstad, Hafrsfjord, Norway

[73] Assignee: Den Norske Stats Oljeselskap A.S, Stavanger, Norway

[*] Notice: This patent is subject to a terminal disclaimer.

[21] Appl. No.: 08/578,638

[22] PCT Filed: Jul. 5, 1994

[86] PCT No.: PCT/NO94/00121

§ 371 Date: May 3, 1995

§ 102(e) Date: May 3, 1996

[87] PCT Pub. No.: WO95/02146

PCT Pub. Date: Jan. 19, 1995

[30] Foreign Application Priority Data

Jul. 6, 1993 [NO] Norway ................................ 932462

[51] Int. Cl.⁶ .................................................. F16L 17/03
[52] U.S. Cl. ........................... 285/96; 285/98; 285/121.5; 285/121.6
[58] Field of Search ........................... 285/96, 98, 121.1, 285/121.3, 121.5, 121.6, FOR 115, FOR 117

[56] References Cited

U.S. PATENT DOCUMENTS 2,768,843  10/1956  Zeilman .
4,405,162   9/1983  Williams ..................... 285/121.6 X
4,647,076   3/1987  Pollack et al. .
4,662,657   5/1987  Harvey et al. ...................... 285/96
4,669,758   6/1987  Feller et al. ............... 285/121.6 X
4,849,966   7/1989  Gibb .............................. 285/106
4,925,219   5/1990  Pollack et al .
5,697,732  12/1997  Sigmundstad .................... 405/169

FOREIGN PATENT DOCUMENTS

0 144 110   6/1985  European Pat. Off. .
0 150 591   8/1985  European Pat. Off. .
0 154 395   9/1985  European Pat. Off. .
37 25 222   2/1989  Germany .
1 557 108  12/1979  United Kingdom .
2 132 726   7/1984  United Kingdom .
2 163 505   2/1986  United Kingdom .

*Primary Examiner*—Heather Shackelford
*Attorney, Agent, or Firm*—Foley & Lardner

[57] ABSTRACT

A swivel device comprising inner and outer mutually rotatable swivel members having respective inner fluid paths communicating with each other through one or more associated annular spaces at the interface between the swivel members. The annular spaces being sealed from each other by seals. The swivel members are formed as an outer female member and an inner male member so that the male member can be introduced axially into the cooperating female member to an operative working position, or withdrawn from the female member when disconnecting the swivel members. The seals between the annular spaces are arranged to be activated for active sealing in the operative working position, and to be relieved in case of manual disconnection of the swivel members.

9 Claims, 7 Drawing Sheets

SWIVEL APPARATUS FOR FLUID TRANSPORT

The present invention relates to a swivel device comprising inner and outer mutually rotatable swivel members, wherein the swivel members have respective inner fluid paths communicating with each other through one or more associated annular spaces at the interface between the swivel members, the annular spaces being sealed from each other by means of sealing means.

Many different embodiments of swivel structures of the above-mentioned type are in use within the industry. Within the offshore industry swivel devices are used e.g. for allowing the transfer of hydrocarbons (oil and gas) or another process fluid through coupling members which rotate or are to be rotatable in relation to each other, for example between a marine riser which is coupled to a floating loading buoy, and a tube system on a tanker which is coupled to the buoy and is to be rotatable about the buoy under the influence of wind, waves and water currents.

In different fields of application it may be of current interest to use swivel devices which are constructed in such a way that the inner and outer swivel members in a simple manner can be disconnected from each other, and wherein a swivel member later can be connected to a cooperating swivel member in another swivel device of the topical type, to form an operative swivel unit. It will here be of essential importance that the swivel members can be disconnected from or connected to each other in a simple, quick and safe manner, at the same time as an efficient and safe sealing between the swivel members is obtained.

Thus it is a general object of the invention to provide a swivel device enabling that the swivel members can be connected to or disconnected from each other in a simple and quick manner, at the same time as an efficient and safe sealing between the annular spaces of the swivel members is obtained in interconnection.

Another object of the invention is to provide a swivel device in which cooperating swivel members can be connected in a simple and quick manner in spite of relatively large tolerance deviations or centre displacements between the swivel members, and with a minimal risk for damaging the swivel members.

A further object of the invention is to provide a swivel device which is suitable for remotely controlled operation in case of mutual connection and disconnection of the swivel members.

A further object of the invention is to provide a swivel device giving the possibility for a simple monitoring of the sealing means and their sealing function.

For the achievement of the above-mentioned objects there is provided a swivel device of the introductorily stated type which, according to the invention, is characterized in that the swivel members are formed as an outer female member and an inner male member, respectively, so that the male member can be introduced axially into a cooperating female member to an operative working position, or withdrawn from the female member when disconnecting the swivel members, the sealing members between the annular spaces being arranged to be activated for an active sealing function in said operative working position, and to be relieved when mutually disconnecting the swivel members.

An advantageous embodiment of the swivel device according to the invention is characterized in that a first one of the swivel members on each side of each of the annular spaces is provided with a peripheral ring groove receiving a radially movable ring element which is provided with sealing means for static sealing against the other swivel member and for dynamic sealing between the ring element and the side walls of the peripheral ring groove.

By means of the stated ring element structure there is achieved that the ring elements of the swivel centre themselves between the swivel members within relatively large tolerances. This is achieved in that the ring elements can float freely in the radial direction and thus can absorb possible centre deviations or centre displacements between the swivel members.

Another advantageous embodiment of the invention is characterized in that the sealing means are arranged to be operated hydraulically by means of a barrier liquid having a higher pressure than the ambient pressure.

By using a barrier liquid having a higher pressure than the ambient pressure, there is obtained a controlled leakage path in the direction from the barrier liquid to the topical process fluid, i.e. from a clean to a "dirty" medium. The barrier liquid suitably may be a hydraulic oil which then simultaneously has a lubricating effect, and the sealing surfaces may be protected by allowing very small quantities of clean barrier liquid to leak out into "the process". By controlling the volume and/or the pressure of the barrier liquid over time, one may thus continuously monitor the seals of the swivel.

The invention will be further described below in connection with exemplary embodiments with reference to the drawings, wherein.

Figure 1:
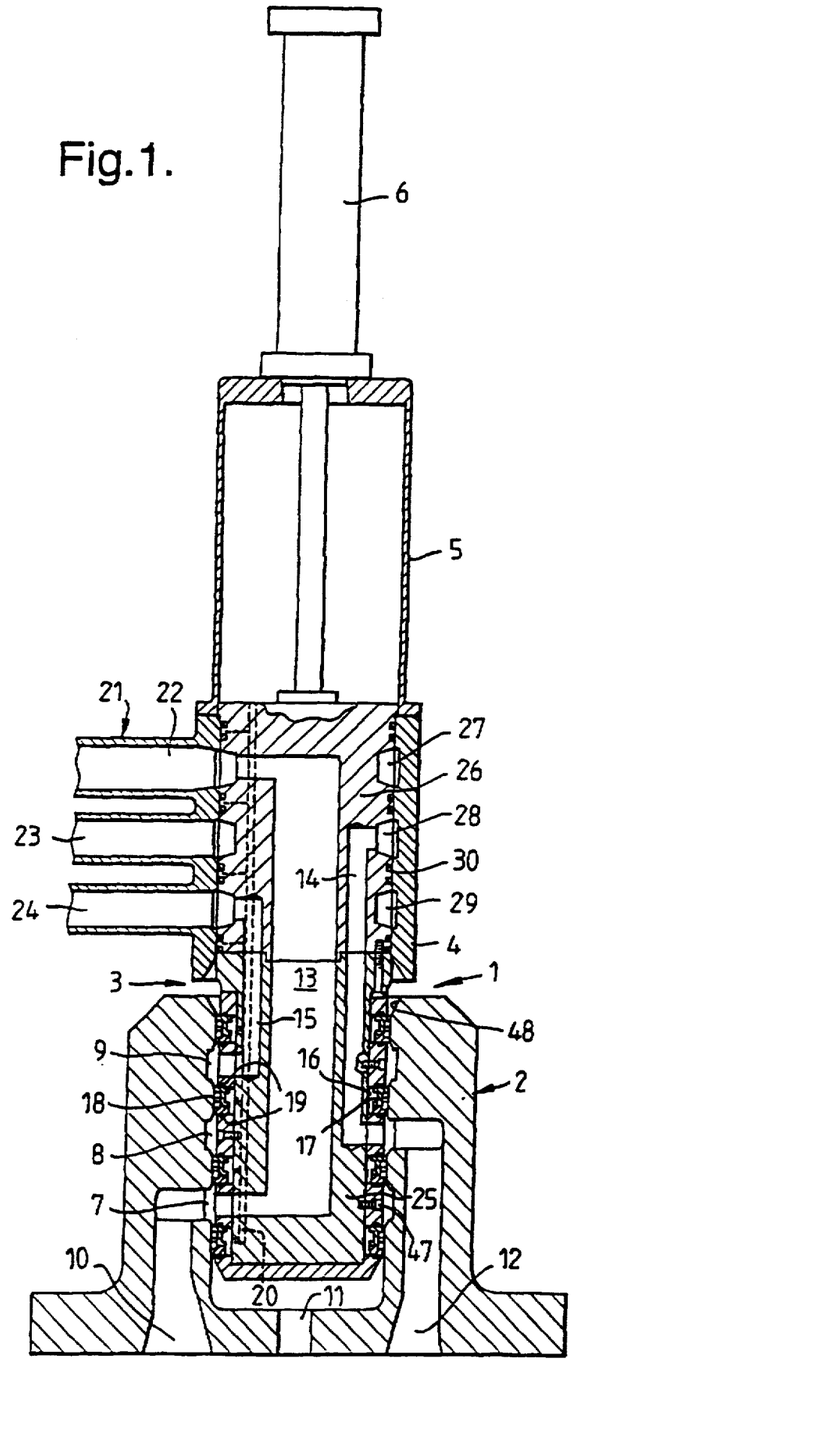
FIG. 1 shows an axially sectioned view of an embodiment of a swivel device according to the invention, wherein the swivel members are shown in interconnected condition.
Figure 2:
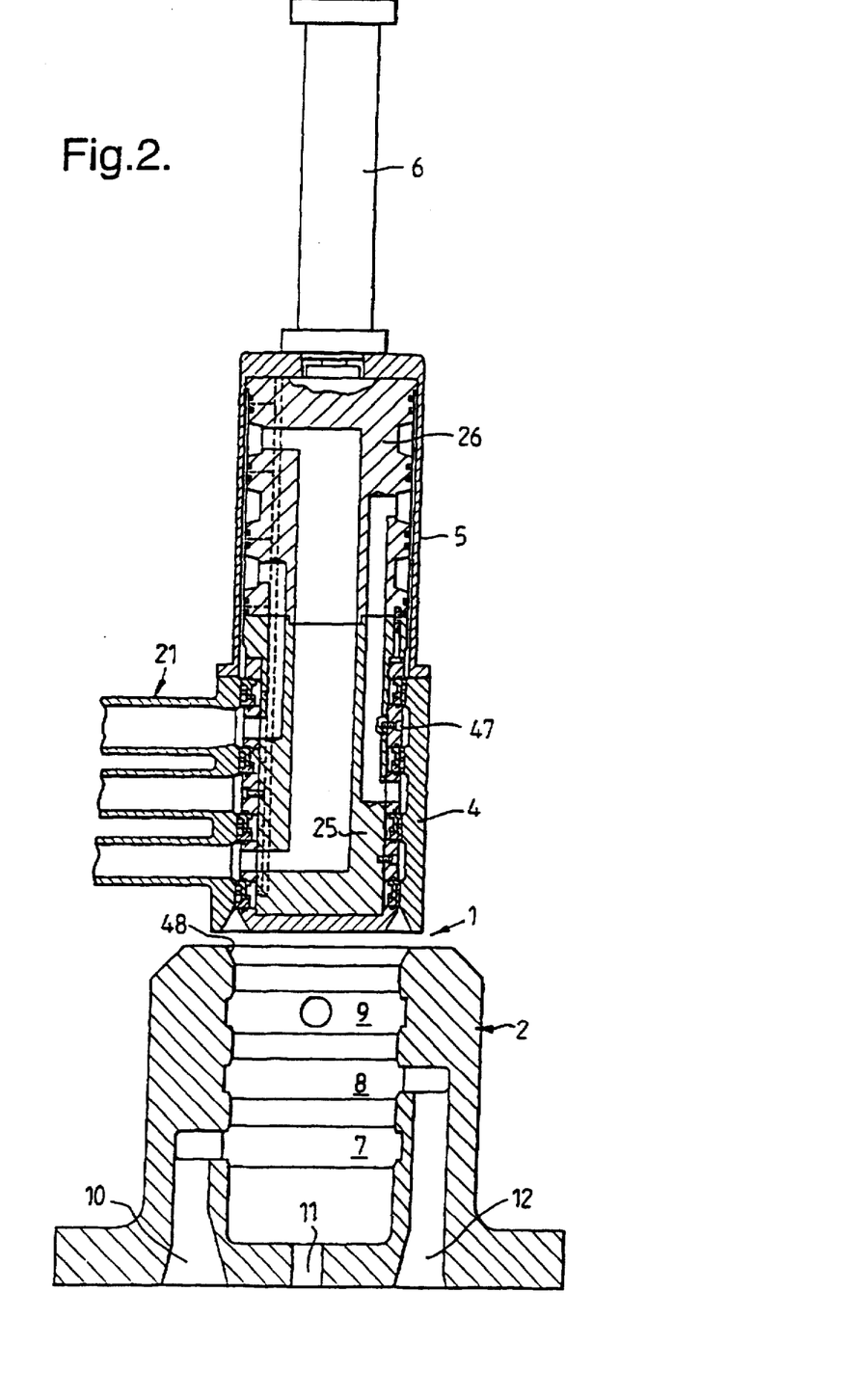
FIG. 2 shows a sectional view corresponding to that of FIG. 1, but with the swivel members in mutually disconnected condition.

The swivel device shown in FIGS. 1 and 2 is particularly intended for use on a vessel for offshore production of hydrocarbons, where the vessel (not shown) has a submerged downwardly open receiving space for receiving a submerged buoy which is anchored to the sea bed and is connected to a number of risers extending between the buoy and e.g. a production well on the sea bed. The swivel device here provides for connection between the risers and a tube system on the vessel, the coupling simultaneously permitting turning of the vessel about the buoy under the influence of wind, waves and water currents, as mentioned in the introduction. Such a system is further described in the simultaneously filed patent application Ser. No. 08/578,637, now U.S. Pat. No. 5,697,732. Even if the invention hereinafter will be described in connection with this field of application, it is to be understood that the invention may also be used in different other fields of application.

The swivel device shown in FIGS. 1–2 consists of an outer swivel member or female member 2 and an inner swivel member or male member 3 which can be lowered into or lifted up from the female member 2. The female member 2 in this case is intended for permanent mounting on the centre member of a submerged buoy (not shown), whereas the male member 3 is shown to be suitably mounted in a guide sleeve 4 which is suitably supported on the topical vessel and which forms a fluid connection between the swivel device and a tube system (not shown) on the vessel, as further described in the above-mentioned patent application.

As shown, the guide sleeve 4 supports a housing 5 which is intended for reception of an upper part of the male member 3 when this is in the raised position (FIG. 2). The housing 5 supports an operating means 6 for raising and lowering of the male member 3. The operating means 6 suitably is a hydraulic actuator, e.g. a cylinder/piston means as shown. It will be clear that, when the male member 3 is to be introduced into the female member 2, the male member must be placed in a suitably centered or coaxial position in relation to the female member. Such a centering or positioning means in practice may be arranged in many different ways. For example, the positioning means may consist of a pivotally mounted arm wherein the shown guide sleeve, or also the male member itself is fastened to one end of the arm, as shown and described in the above-mentioned patent application, and also shown in FIG. 5.

In interconnected condition the swivel members 2, 3 in a conventional manner form common annular spaces communicating with associated fluid paths in the swivel members. The number of annular spaces and fluid paths is dependent on the need in the topical case. In the illustrated example there are arranged three annular spaces 7, 8, 9 which communicate with a separate one of three fluid paths 10, 11, 12 in the female member 2, and with a separate one of three fluid paths 13, 14, 15 in the male member 3. In the illustrated case the annular spaces are formed by peripheral ring channels formed in the female member 2. Alternatively, however, they may be formed in the male member 3, or also in both members, for example to form annular spaces having an essentially circular cross-section.

In the illustrated embodiment the male member 3 on each side of each of the annular spaces is provided with a peripheral ring groove 16 receiving a radially movable ring element 17. Alternatively, the ring grooves and the ring elements may be placed in the female member. The ring element 17 is provided with sealing means 18, 19 which are arranged respectively for static sealing against the female member and for dynamic sealing between the ring element 17 and the side walls of the peripheral ring groove 16. These sealing means may be activated for forming a seal between the annular spaces during operation, and may be relieved in case of mutual disconnection of the swivel members 2, 3. The sealing means suitably are arranged to be operated hydraulically by means of a barrier liquid having a higher pressure than the ambient pressure, i.e. the pressure of the fluid against which it is to be sealed. The barrier liquid is supplied through a suitable supply channel 20 arranged in the swivel member which is provided with the ring grooves 16, i.e. in the illustrated case the male member 3. As shown more clearly in FIG. 3, the supply channel 20 for barrier liquid debouches in a buffer volume which is delimited by the bottom area of the ring groove 16 and the associated ring element 17, and which is in communication with the sealing means 18, 19 of the ring element. Thus, when the sealing means are activated, the male member 3 apart from the ring elements 17 is rotatable in relation to the female member 2. The construction and manner of operation of the sealing means will be described more closely with reference to FIG. 3.

As appears from FIGS. 1 and 2, the ring elements 17 have a larger outer diameter than the rest of the inner swivel member 3, the outer diameter of the ring element essentially corresponding to the inner diameter of the outer swivel member 2. By means of this ring elements structure there is achieved that the ring elements 17 centre themselves in the female member within relatively large tolerances, e.g. ± 12 mm. This is possible since the ring elements can float freely in the radial direction and thus can absorb possible centre deviations or centre displacements between the female member and the male member.

As mentioned above, the male member 3 in the illustrated embodiment is slidably mounted in the guide sleeve 4. The guide sleeve is fastened to a channel means 21 in the form of three tubes 22, 23, 24 which, in a manner not further shown, are connected to said tube system on the vessel. The three tubes may form part of the above-mentioned pivotable arm means for adjustment and manipulation of the male member. The male member comprises a lower stab-in part 25 and a top part 26, and the top part is situated in the guide sleeve 4 when the stab-in part is inserted in the female member 2, as appears from FIG. 1. In this position the guide sleeve 4 and the top part 26 define three common annular spaces 27, 28, 29 communicating with respective ones of the fluid paths 13, 14, 15 of the male member 3 and with said tubes 22, 23, 24, the guide sleeve 4 having through holes between the annular spaces and the associated tubes. Between the annular spaces the top part 26 is provided with hydraulically actuated static sealing means 30 which correspond to the sealing means 18 and which are activated by the barrier liquid through the supply channel 20.

Figure 3:
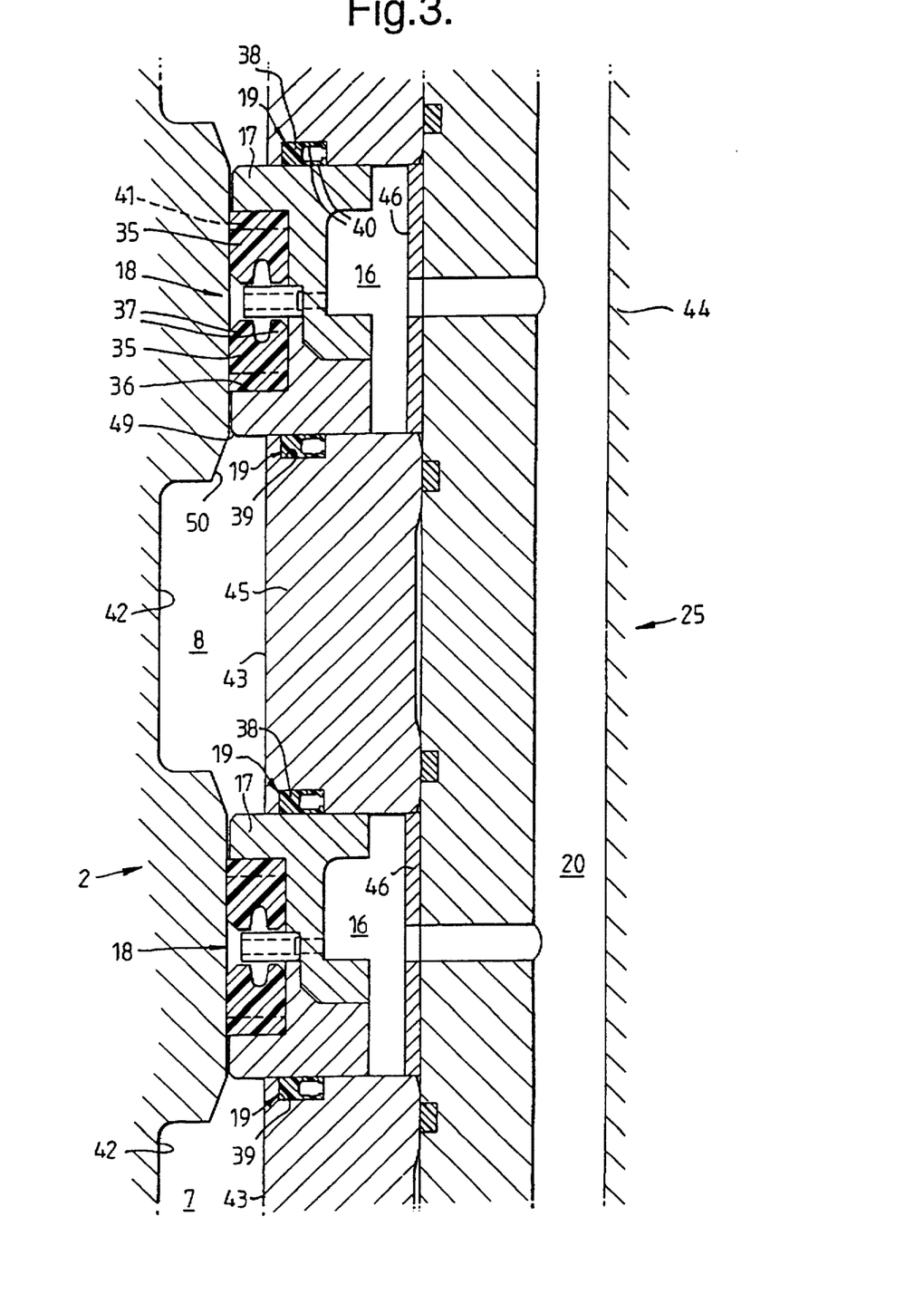
FIG. 3 shows an enlarged segment of the swivel device in FIGS. 1–2, and shows an embodiment of static and dynamic sealing means used in the swivel device.

An embodiment of the static and dynamic sealing means is shown more closely in FIG. 3. The figure shows a segment of the female member 2 and the stab-in part 25 of the male member 3 with the members in interconnected position and shown in longitudinal section through the axis of the swivel device, as in FIG. 1.

The static sealing means 18 consists of a pair of U-shaped lip seals 35 placed in a peripheral groove 36 in the ring element 17 which may also be called a static seal housing. The ring element consists of a pair of steel rings which are assembled and fastened to each other as shown in the Figure so that the sealing elements may be placed in the groove 36 before the steel rings are mounted to each other. The U-shaped lip seals consist of a suitable elastomeric material and have axially directed legs 37, wherein the outer leg under the influence of the barrier liquid is pressed outwards to frictionally locking engagement with the adjacent sealing surface of the female member 2. As mentioned, the barrier liquid is supplied through the supply channel 20 and the buffer volume at the bottom of the ring groove 16, the ring element 17 being provided with suitable openings for this purpose.

Each of the elastomeric sealing elements 35 is provided with an embedded supporting ring 41 (suggested with dashed lines), to prevent extrusion of sealing element material between mutually adjacent sealing surfaces, under pressure influence from the barrier liquid.

The dynamic sealing means 19 also consists of a pair of elastomeric U-shaped lip seals 38, but these sealing elements are placed in separate ring grooves 39 in the side walls of the peripheral ring groove 16, as they are to form a seal between the ring element 17 and the adjacent portion of the male member 3 in case of rotation thereof in the female member 2. The U-shaped sealing elements 38 have radially directed legs 40 which, under under the influence of the barrier liquid, are pressed to dynamic sealing against the ring element 17 and the ring grooves 39, respectively.

The sealing elements 38 will also be provided with similar supporting rings (not shown) as those mentioned for the sealing elements 35, to prevent extrusion of the sealing material.

When the male member and the female member are in the interconnected position, the ring elements 17 have, as mentioned, centered themselves within the female member 2, as they are freely movable in the radial direction. The barrier liquid (e.g. hydraulic oil or water) is set under pressure, and the barrier liquid pressure forces the static sealing elements 35 to expand against the sealing surface of the female member and locks the ring elements or seal housings in their position. As regards the dynamic seal, a little gap between the sealing surfaces of the ring element 17 and the ring groove 16 leads the barrier liquid to the sealing element 38. The pressure difference between the barrier liquid and the process fluid brings the sealing element into firm contact with the sealing surface of the ring element.

Thus, when the sealing means 18 and 19 are activated, the static sealing elements 35 lock the ring elements 17 frictionally to the female member 2, whereas the adjacent side walls of the ring elements 17 and ring grooves 16 form mutually movable sliding surfaces which are sealed by means of the dynamic sealing elements 38. For the sealing function of the static seal it is of decisive importance that a firm and strong frictional fastening is achieved between the sealing element and the sealing surfaces of the female member. Movement between the sealing element and the female member will cause a leakage because of the large pressure differences across the seal. The pressure and the coefficient of friction will be decisive, and as sealing material one will choose an elastomeric material giving the largest possible friction. For the dynamic seal, on the other hand, one will choose an elastomeric material giving a low friction between the sliding surfaces, to achieve a good seal with a low friction.

When the male member and the female member are to be disconnected from each other, the barrier liquid pressure is relieved, so that the ring elements 17 are no longer locked in their position. The male member can now be withdrawn from the female member. Even if the sealing elements during this operation are relieved, they are still in contact with their sealing surfaces.

As appears from FIG. 3, the annular spaces 7, 8, 9 of the swivel device in the illustrated embodiment are delimited by a ring channel 42 in the female member 2, by the ring elements 17 of the male member 3 situated at the side of the ring channel, and by the surface portion 43 of the male member between the ring elements. The stab-in part 25, of the male member comprises a cylindric centre body 44 and a number of separate fluid-path lead-through elements 45 situated between the ring elements 17, said elements 17 and 45 being introduced successively on the centre body together with distance sleeves 46 situated radially inside of respective ring elements 17 and maintaining a suitable distance between the lead-through elements 45 in relation to the width of the ring elements 17 in the axial direction of the male member. At least the outermost located lead-through elements are fixed on the centre body 44 by means of respective locking screws 47 (shown in FIG. 1 and 2).

As appears from FIGS. 1 and 2, the outer edge of the inner surface of the female member 2 is bevelled as shown at 48, to facilitate introduction of the male member 3 into the female member 2. For this purpose also the outer side edges of the ring elements 17 and the adjacent side edge portions of the ring channels 42 of the female member are bevelled, as shown at 49 and 50, respectively, in FIG. 3.

Figure 4:
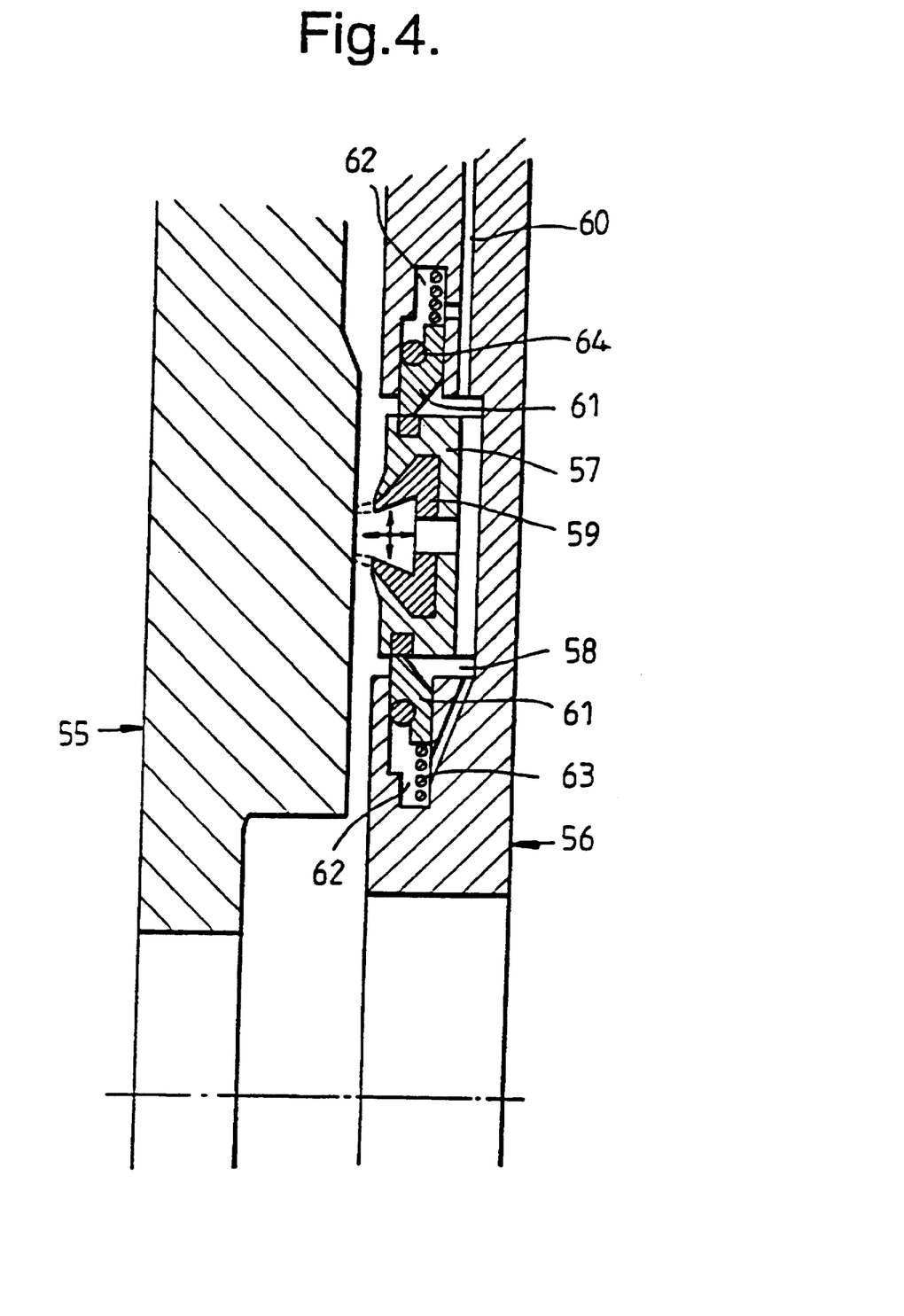
FIG. 4 shows a sectional view of another embodiment of the static and dynamic sealing means in the swivel device.

An alternative embodiment of a ring element and sealing assembly is shown in FIG. 4. In the figure, interspace distances and clearances between individual elements are strongly exaggerated for the sake of clarity. In a manner corresponding to FIG. 3 there is shown a segment of a female member 55 and a stab-in part of a male member 56 with the members in interconnected position, and shown in longitudinal section through the axis of the swivel device. In this embodiment a radially movable ring element 57 is arranged in a peripheral ring groove 58 in the male member 56. In the ring element there is placed a static sealing means in the form of a U-shaped lip seal element 59 having lips which are directed towards the adjacent sealing surface of the female member 55. Barrier liquid is supplied through a channel 60 to a buffer volume at the bottom of the ring groove 58. When the barrier liquid is pressurized, the sealing lips are pressed outwards into frictionally locking engagement with the adjacent sealing surface of the female member.

The dynamic sealing means here consists of a pair of sealing elements 61 which are sealingly placed in respective ring grooves 62 on each side of the ring element 57, in sealing engagement with an adjacent sealing surface of the ring element. As shown, each ring groove 62 is connected to the supply channel 60 for barrier liquid. In the bottom portion of the ring groove there is placed a pressure spring 63 acting on the sealing element in addition to the pressure from the barrier liquid. Further, each sealing element 61 is acted upon and retained by an O-ring 64 placed in the ring groove.

As will be seen by a person skilled in the art, in the sealing surface between the sealing elements 61 and the adjacent abutment or seating surface of the ring element 57, there will be established a force balance between the "closing" forces represented by the force from the spring 63 and the hydraulic force due to the barrier liquid pressure, and the "opening" forces represented by the hydraulic force due to the process fluid pressure and the barrier liquid pressure. With a suitable configuration of the sealing element 61 with respect to choice of diameter of the abutment surface of the sealing element against the ring element 57, and with a suitable choice of O-ring diameter and spring pressure, one is able to influence the unbalanced force with which the sealing element 61 is pressed against the abutment surface, and thereby obtain a desired surface pressure in the dynamic sealing surface. Thus, an optimum dynamic sealing function can be obtained.

As will be appreciated, the manner of operation and the functional properties of the embodiment in FIG. 4 in other respects are essentially the same as those of the previously described embodiment, and therefore in this respect reference is made to the preceding description.

Figure 5:
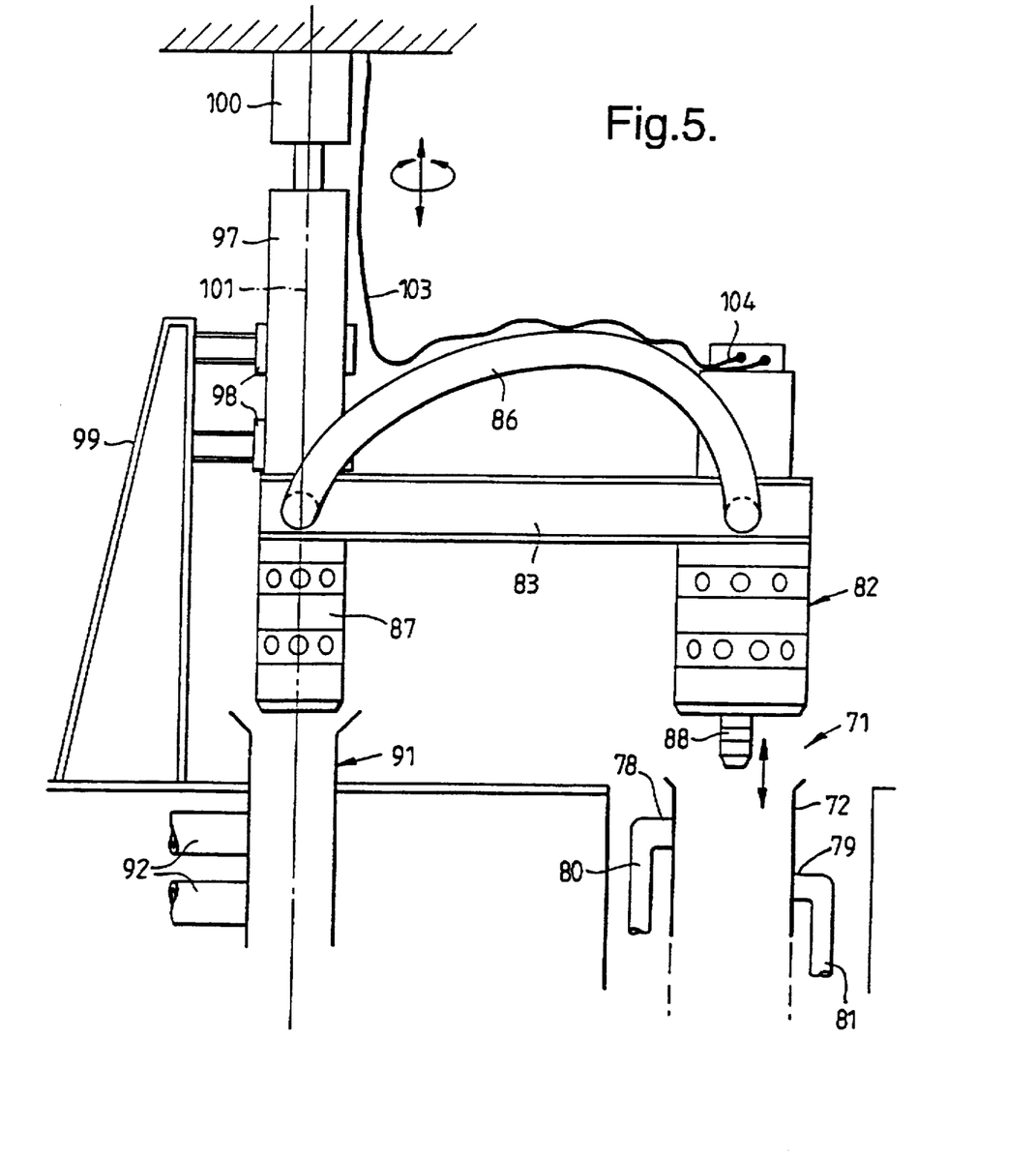
FIG. 5 shows a schematic, partly sectioned side view of a swivel device according to the invention, wherein the swivel device is part of a system for offshore production of hydrocarbons by means of a vessel and a submerged buoy, and is connected to a positioning and operating means for interconnection and disconnection, respectively, of the swivel members.
Figure 6:
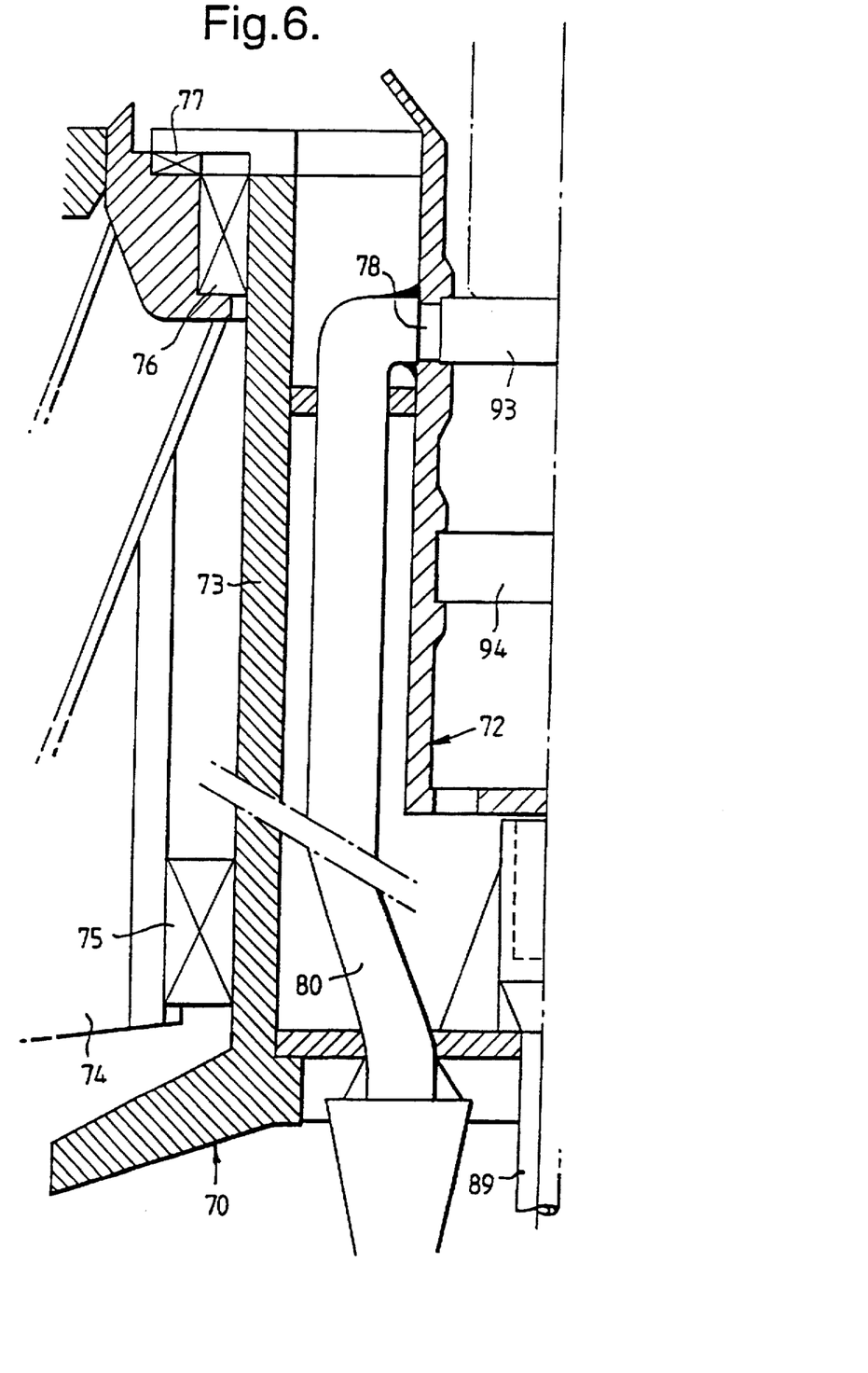
FIG. 6 shows a fragmentary longitudinal sectional view of the female member of the swivel device mounted in the buoy in the system according to FIG. 5.
Figure 7:
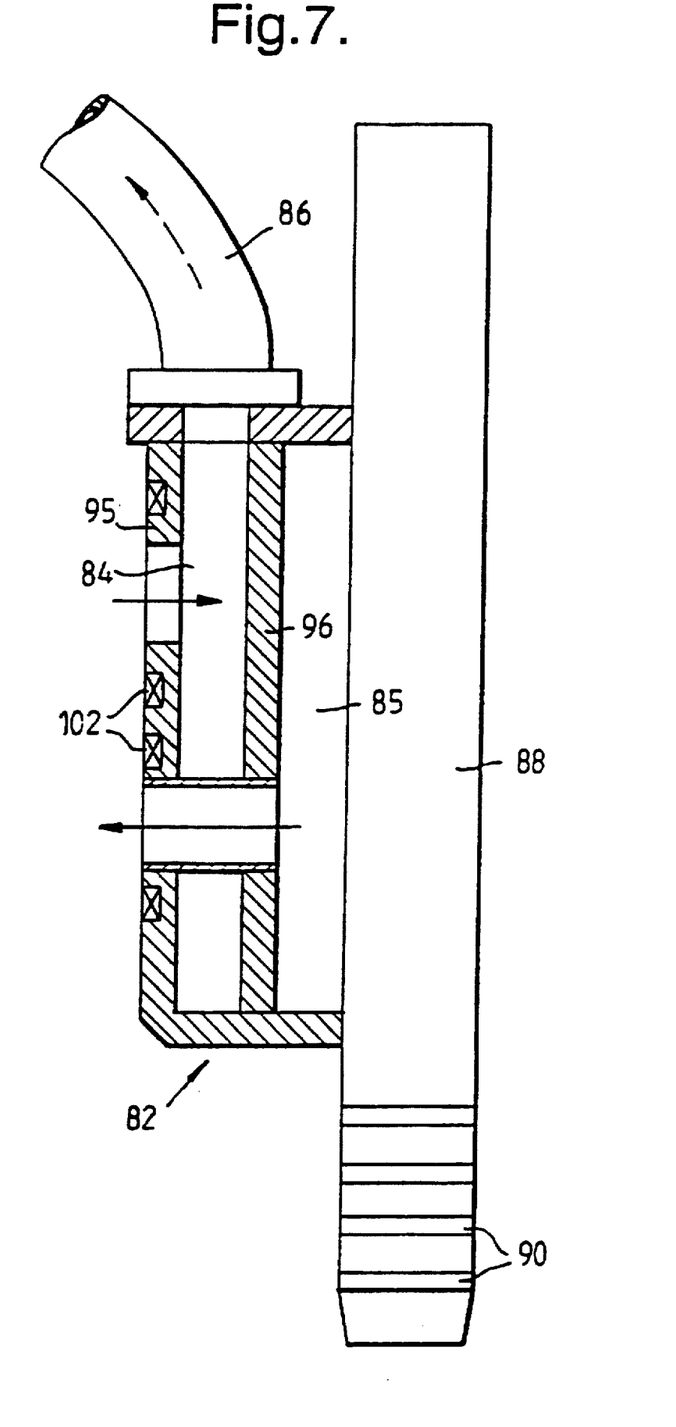
FIG. 7 shows a longitudinal sectional view of a part of the male member in the embodiment according to FIG. 5.

FIGS. 5–7 show an embodiment of the swivel device wherein this forms part of a system for offshore production of hydrocarbons by means of a vessel which is arranged for connection to and disconnection from a submerged buoy, wherein the buoy comprises an outer buoyancy member for introduction and releasable securing in a submerged downwardly open receiving space in the vessel, and a centre member which is rotatably mounted in the outer member and which is anchored to the sea bed and is connected to at least one riser extending up to the buoy. In this connection reference is made to the patent application mentioned in the introduction.

In the embodiment according to FIGS. 5–7 the swivel device 71 comprises a female member 72 which, in FIG. 6, is shown to be fastened to—and more specifically mounted in—the centre member 73 of a buoy 70 which is releasably secured in the receiving space in the topical vessel (not shown). The buoy is schematically shown to comprise an outer buoyance member 74 in which the centre member 73 is mounted by means of two radial bearings 75, 76 and an axial bearing 77. The female member 72 comprises a pair of fluid paths 78, 79 which are connected to respective risers 80, 81 introduced into the buoy.

A male member 82 is rigidly fastened to one end of an arm means 83, and its fluid paths 84, 85 (see FIG. 7) are connected to respective tubes 86 (only one tube shown) extending along the arm means 83 to inner fluid paths in a coupling member or coupling plug 87 which is rigidly fastened to a rotatably mounted end of the arm means. The male member is also provided with an umbilical coupling comprising a centrally placed plug member 88 which is intended for interconnection with an umbilical riser 89 which is also connected to the buoy 70. The umbilical contains the necessary electrical and hydraulic control lines which are connected through electrical contact ribbons 90 and hydraulic couplings (not shown) at the lower end of the plug member 88.

It is to be remarked that an umbilical coupling having a suitable umbilical plug member in practice normally will also be arranged in connection with the swivel embodiment according to FIGS. 2 and 3. The plug member then will be arranged at the lower end of the male member, for connection at a corresponding coupling point in the female member.

It is also to be remarked that the embodiment in FIG. 6 is constructed so that the risers together with the female member 72 may be pulled up through the centre member of the buoy and into the vessel. This will be advantageous for maintenance purposes.

The system further comprises a means for raising of the arm means 83 with the male member 82 and the coupling member 87 as a unit, and for turning of said unit in the raised position, so that the male member may be pivoted between a storage position at the side of the receiving space of the vessel and a service position centered over the buoy. In the lowered service position wherein the male member 82 is connected to the female member 72, the coupling member 87 is placed in a connector in the form of a coupling sleeve 91 for connection of inner fluid paths in the coupling member to the tube system 92 of the vessel for process fluids.

In the swivel device 73 the female member 72 in a conventional manner is provided with peripheral channels 93, 94 (FIG. 6) for the formation of annular spaces for communication with the fluid paths 84, 85 of the male member (FIG. 7). In a corresponding manner the coupling sleeve 91 is provided with annular spaces (not shown) forming a connection between the fluid paths of the coupling member 87 and the tube system 92 of the vessel. As shown in FIG. 7, the fluid paths 84, 85 of the male member 82 are delimited inside of concentric tube elements 95, 96, these fluid paths communicating with the associated annular spaces 93, 94 of the female member via openings in the tube walls.

As will be clear from a consideration of FIG. 7, the length and diameter of the male member may be substantially reduced if only one medium is to be transferred.

For raising, lowering and turning of the arm means 83 with the male member 82 and the coupling member 87, the arm means at the rotatably mounted end is provided with an upright shaft member 97 which is rotatably and axially slidably mounted in a bearing means 98. The bearing means 98 is arranged in a rack 99 which is suitably supported on the vessel. For raising and lowering of the arm means and the elements supported thereby the shaft member 97 is coupled to a hydraulically driven manipulator 100 which may have a predetermined up/down movement. For the horizontal rotating or turning movement of the arm means, there may suitably be arranged a separate actuator (not shown), e.g. a hydraulic cylinder/piston means.

In the illustrated embodiment the shaft member 97 and therewith the axis of rotation 101 of the arm means 83 are concentric with the coupling member 87 and therewith the longitudinal axis of the coupling sleeve 91. This coaxial arrangement may be advantageous when geometrical and/or dimensioning-related reasons dictate a placing of the rotating shaft at the opposite end of the arm means in relation to the male member 82. It is also conceivable, however, that the axis of rotation of the arm is placed at a suitable place between the male member and the coupling member, as this may give an advantageous balancing of the arm means and the elements supported thereby, and therewith reduced load moments and load forces on i.a. the bearing means 98.

The swivel device 71 in the system according to FIGS. 5–7 is constructed in a similar manner as in the previously described embodiment, both with respect to radially movable ring elements for absorption of relatively large tolerances and centre deviations, and with respect to static and dynamic sealing means which are activated by means of a barrier liquid having a higher pressure than the ambient pressure. Therefore, reference is here made to the previous description as regards the general construction and function of these means, and the advantages achieved.

Also in this embodiment the combined ring element and sealing assemblies are arranged in the male member, for placing on each side of the annular spaces 93 and 94 of the female member 72 when the male member is introduced in the female member. In FIG. 7 these assemblies are only shown schematically as blocks 102. Barrier liquid to these assemblies is supplied through a non-illustrated supply channel communicating with the line 103 for barrier liquid shown in FIG. 5. (This line is shown to be partly coinciding with an umbilical line 104 connected at the top of the male member 82.) Barrier liquid is also supplied through a non-illustrated supply line to static sealing means arranged in the coupling member 87, in a manner corresponding in principle to that of the top part 26 of the male member 3 in the embodiment according to FIGS. 2 and 3.

I claim:

1. A swivel device comprising:
   inner and outer mutually rotatable swivel members having respective inner fluid paths communicating with each other through respective annular spaces at an interface between said swivel members, said swivel members including a female outer member and a male inner member, said male member being axially displaceable with respect to said female member from an operative working position for fluid communication via the respective inner fluid paths and annular spaces to a disconnected position wherein said male member is axially withdrawn from said female member, a first one of said swivel members includes a peripheral ring groove on each side of each of said annular spaces; and
   seals between said annular spaces, said seals being activated in said operative working position and being relieved when disconnecting said swivel members, each peripheral ring groove receiving a radially movable ring element engaging said seals, said seals including a static seal against a second one of said swivel members and dynamic seals against radially extending side walls of said peripheral ring groove, said seals being activated by a barrier liquid having a higher than ambient pressure being provided through a supply channel in said first swivel member.

2. A swivel device according to claim 1, wherein said first swivel member is said inner swivel member, and said ring elements have a larger outer diameter than said first swivel member, the outer diameter of said ring element essentially corresponding to an inner diameter of said outer swivel member.

3. A swivel device according to claim 2, wherein each of said annular spaces is delimited by a combination including: a respective ring channel in said second swivel member, said ring elements situated in said ring grooves on either side of said annular space, and a surface portion of said first swivel member between said ring elements.

4. A swivel device according to claim 2, wherein said inner swivel member comprises a cylindrical center body supporting a plurality of separate fluid-path lead-through elements interposed between said ring elements, said fluid-path lead-through elements being successively mounted on said center body and axially spaced apart by distance sleeves situated radially inside each of said ring elements.

5. A swivel device according to claim 3, wherein radially outer edges of said ring elements and radially inner edges of said ring channels on said outer swivel member are chamfered to facilitate insertion of said inner swivel member in said outer swivel member.

6. A swivel device according to claim 1, wherein said static seals include a U-shaped lip seal having radially inner and outer legs extending axially with respect to said swivel members, the barrier liquid pressing said outer legs into frictional locking engagement with said second swivel member.

7. A swivel device according to claim 1, wherein said dynamic seals include elastomeric U-shaped lip seals in respective annular grooves of said first swivel member on each axial side of said ring elements, each of said dynamic seals include radially directed legs pressed by the barrier liquid to dynamically seal against a respective ring element and a respective annular groove.

8. A swivel device according to claim 1, wherein said dynamic seals are placed in respective annular grooves in said first swivel member on each side of said ring elements, said annular grooves are connected to said supply channel for the barrier liquid, and a mechanical spring acts upon said sealing element in addition to the pressure from the barrier liquid.

9. A swivel device according to claim 8, wherein said dynamic seals are retained by an O-ring in said annular groove, and wherein the action of said spring, the diameter of said O-ring and the diameter of said dynamic seals abutting said ring element generate an unbalanced force pressing said dynamic seals against said ring element.

* * * * *